United States Patent
Brown et al.

(10) Patent No.: US 7,681,940 B2
(45) Date of Patent: Mar. 23, 2010

(54) REAR DOOR ASSEMBLY FOR A MOTOR VEHICLE

(75) Inventors: Bernard Patrick Brown, Farmington, MI (US); Kenji Chiba, Northville, MI (US); Hiroshi Takizawa, Toyota (JP)

(73) Assignees: Toyota Motor Engineering & Manufacturing North America, Inc., Erlanger, KY (US); Toyota Motor Corporation, Toyota (JP)

( * ) Notice: Subject to any disclaimer, the term of this patent is extended or adjusted under 35 U.S.C. 154(b) by 217 days.

(21) Appl. No.: 11/837,998

(22) Filed: Aug. 13, 2007

(65) Prior Publication Data
US 2009/0044457 A1 Feb. 19, 2009

(51) Int. Cl.
*B60J 5/02* (2006.01)
(52) U.S. Cl. .................... 296/146.8; 296/146.6
(58) Field of Classification Search .......... 296/146.8, 296/146.9, 146.1, 146.5, 146.7
See application file for complete search history.

(56) References Cited

U.S. PATENT DOCUMENTS

| | | | | |
|---|---|---|---|---|
| 4,664,437 A * | 5/1987 | Queveau | ................ | 296/146.8 |
| 4,875,733 A | 10/1989 | Chado et al. | | |
| 4,880,267 A * | 11/1989 | Ohya | ................... | 296/56 |
| 5,246,263 A | 9/1993 | Tanaka et al. | | |
| 6,019,418 A * | 2/2000 | Emerling et al. | ........ | 296/146.8 |
| 6,053,562 A * | 4/2000 | Bednarski | ............. | 296/146.5 |
| 6,089,342 A | 7/2000 | Muller et al. | | |
| 6,431,638 B1 * | 8/2002 | Mrozowski et al. | ...... | 296/146.8 |
| 6,523,882 B2 * | 2/2003 | Ishikawa et al. | ......... | 296/146.8 |
| 6,629,352 B2 * | 10/2003 | Seksaria et al. | ............... | 29/428 |
| 6,776,449 B2 * | 8/2004 | Komatsu et al. | ......... | 296/146.5 |
| 6,886,874 B2 * | 5/2005 | Abe | ......................... | 296/1.08 |
| 6,929,308 B2 | 8/2005 | Komatsu et al. | | |
| 6,988,763 B2 | 1/2006 | Saeki et al. | | |
| 7,021,697 B2 | 4/2006 | Bodin et al. | | |
| 7,152,914 B2 | 12/2006 | Dingman et al. | | |
| 7,322,636 B1 * | 1/2008 | Woodhouse et al. | ........ | 296/147 |
| 7,537,267 B2 * | 5/2009 | Tanaka et al. | ........... | 296/146.6 |
| 7,591,501 B2 * | 9/2009 | Tanaka et al. | ........... | 296/146.6 |
| 2006/0191206 A1 * | 8/2006 | Mooney et al. | ............. | 49/502 |
| 2008/0030047 A1 * | 2/2008 | Munenaga et al. | ....... | 296/146.6 |

FOREIGN PATENT DOCUMENTS

| | | |
|---|---|---|
| JP | 06211049 | 8/1994 |
| JP | 06219156 | 8/1994 |
| JP | 06219157 | 8/1994 |
| JP | 2001328562 | 11/2001 |

* cited by examiner

*Primary Examiner*—Kiran B. Patel
(74) *Attorney, Agent, or Firm*—Gifford, Krass, Sprinkle, Anderson & Citkowski, P.C.

(57) ABSTRACT

A rear door assembly for a motor vehicle includes an outer door panel and an inner panel. The inner panel is fixedly secured to the inner surface of the outer door panel. The inner panel has a main frame having a generally transversely extending opening and a frame member fixedly secured to the main frame. The frame member extends between opposite sides of the opening in the main frame and extends along a bottom edge of the window opening. The frame member has a transversely extending upper flange and a lower flange spaced apart from the upper flange. The frame member has a main wall extending between the upper and lower flanges and forming a generally U-shaped cross section therewith. The flanges are directly fixedly secured to the inner surface of the outer panel and forming a transversely extending support beam therewith.

13 Claims, 5 Drawing Sheets

REAR DOOR ASSEMBLY FOR A MOTOR VEHICLE

FIELD OF THE INVENTION

The invention relates to a rear door assembly for a motor vehicle. More particularly, the invention relates to a two-piece inner door panel of the rear door assembly and a method for making the same from a single blank of steel.

BACKGROUND OF THE INVENTION

Motor vehicles include doors that provide access to a passenger compartment and/or a storage compartment in the vehicle. A motor vehicle door is typically a door assembly formed from such components as a main frame, an outer door skin affixed to one side of the main frame and an inner door panel affixed to an opposite side of the main frame. "Beltline" reinforcements may be used to strengthen the door assembly transversely along the bottom edge of the window, i.e. the "beltline." Additional bracketry is often utilized to support such accessories as lamp housings, wiper mechanisms and the like. But, such bracketry requires additional tooling and, therefore, adds tooling and manufacturing costs to the design. It, therefore, remains desirable to minimize the number of components in the design by integrating such bracketry with the main structural components of the door assembly, such as the inner panel or belt line reinforcement.

Additionally, some vehicle manufacturers utilize a standard metal press tool size across their various vehicle programs to reduce overall manufacturing costs. Using a standard metal press tool size, however, limits the depth of parts that can be produced with the standard tools. It is also, therefore, desirable to provide a rear door design with components that can be produced from subcomponents formed in a single pressing operation and assembled together in a subsequent assembly operation.

SUMMARY OF THE INVENTION

According to one aspect of the invention, a rear door assembly is provided for a motor vehicle comprising an outer door panel and an inner panel. The outer panel having a window opening and an inner surface. The inner panel is fixedly secured to the inner surface of the outer door panel. The inner panel has a main frame with a generally transversely extending opening and a frame member fixedly secured to the main frame. The frame member extends between opposite sides of the opening in the main frame and extends along a bottom edge of the window opening. The frame member has a transversely extending upper flange and a lower flange spaced apart from the upper flange. The frame member has a main wall extending between the upper and lower flanges and forming a generally U-shaped cross section therewith. The flanges are directly fixedly secured to the inner surface of the outer panel and form a transversely extending support beam therewith.

According to another aspect of the invention, a method of manufacturing the aforementioned rear door assembly includes the steps of: press forming the main frame and the frame member as separate pieces from a single blank of metal; and fixedly securing the main frame and the member frame together to form the inner panel.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
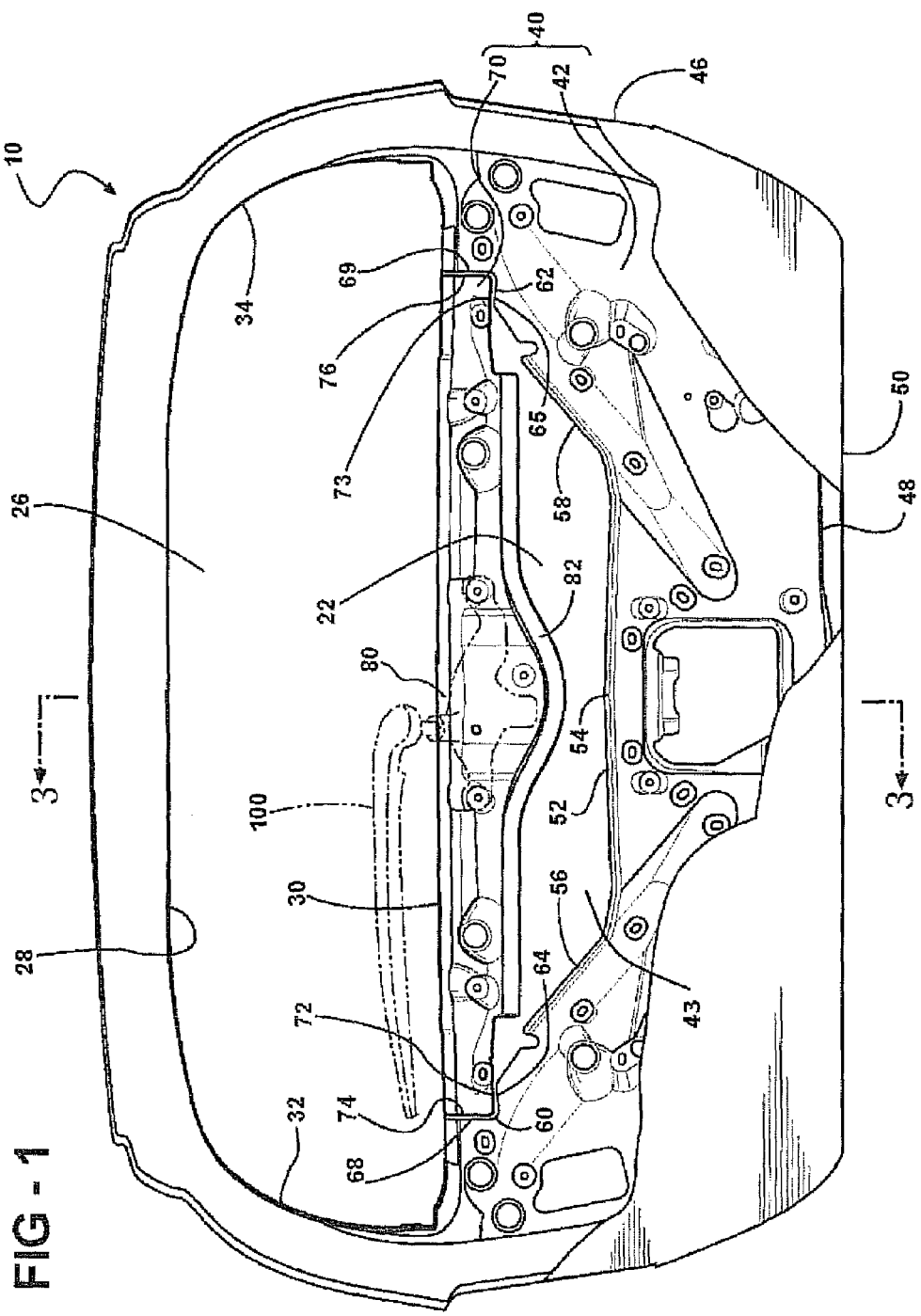
FIG. 1 is a front elevational view of a rear door assembly according to one embodiment of the invention.
Figure 3:
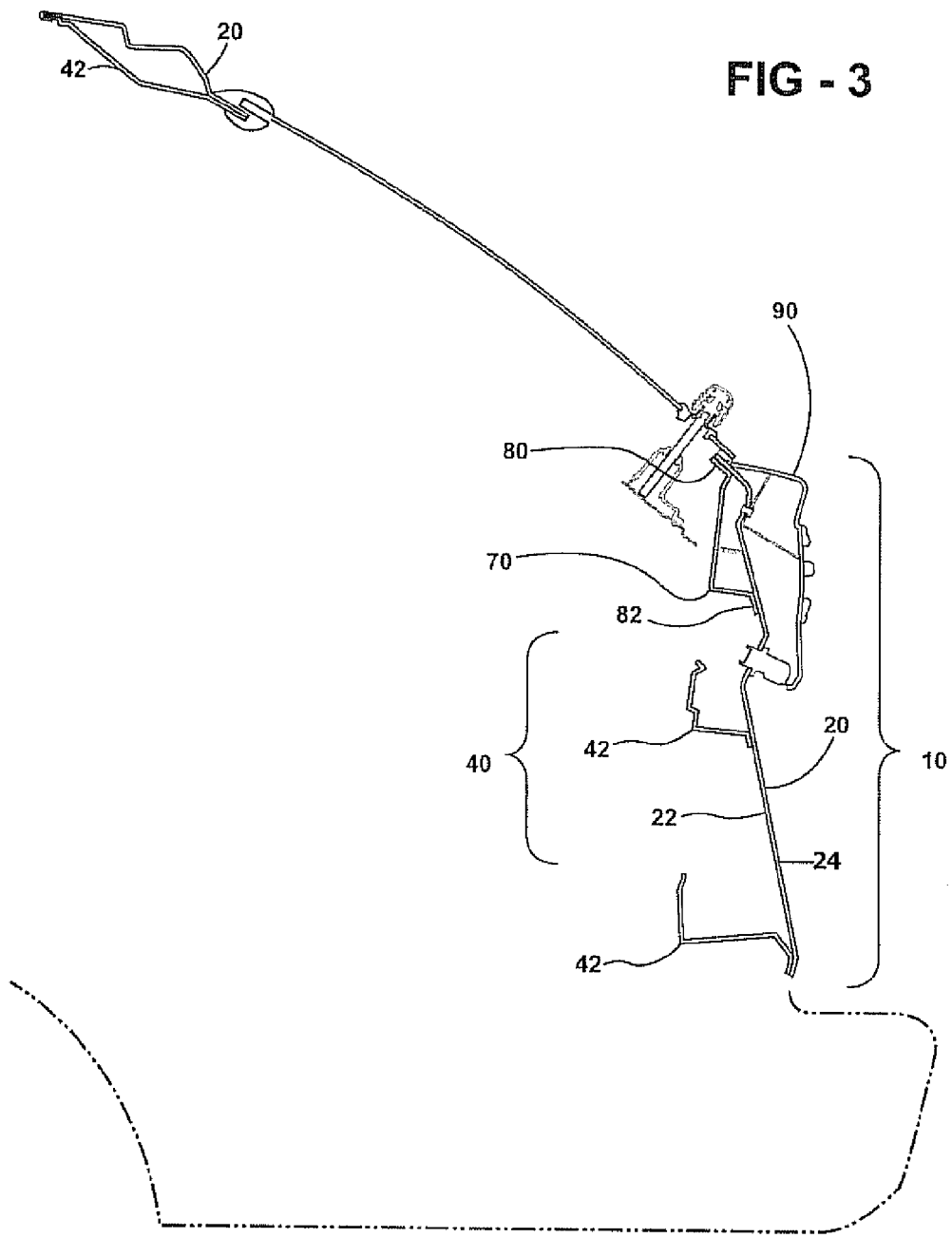
FIG. 3 is a cross sectional view of the frame member of the inner door panel.

Referring to FIGS. 1 and 3, a rear hatch or door assembly for a motor vehicle is generally indicated at 10. The door assembly 10 includes an outer panel 20 having an inner surface 22 and an opposite outer surface 24. The door assembly 10 also includes an inner panel 40 fixedly secured to the inner surface 22 for reinforcing the outer panel 20. A window 26 is formed by corresponding openings in the outer panel 20 and the inner panel 40. The window 26 extends generally vertically between opposing top 28 and bottom 30 edges and transversely in the vehicle between spaced apart side edges 32, 34 of the panels 20, 40. Described in greater detail below, the inner panel includes a frame member that reinforces the door assembly along the bottom edge of the window and supports a wiper assembly.

The inner panel 40 includes a main frame 42 that extends transversely in the vehicle between opposite sides 44, 46 of the outer panel. The main frame 42 includes an opening 43 that generally corresponds with the window opening 26 in shape, but is taller than and extends below the window opening 26. The main frame 42 includes an upwardly facing edge 52 that defines the bottom of the opening 43 in the main frame 42. The upwardly facing edge 52 has a generally horizontal middle section 54 and a pair of angled sections 56, 58 that are angled upwardly and outwardly from respective opposite ends of the middle section 54. Each of the angled sections 56, 58 of the upwardly facing edge 52 terminates at a respective locating section 60, 62. Each locating section 60, 62 includes a generally horizontal locating surface 64, 65 and a generally upright locating surface 68, 69.

The inner panel 40 includes a frame member 70 that extends transversely in the vehicle between the locating sections 60, 62 of the main frame 42 and is spaced above the upwardly facing edge 52. The frame member 70 has bottom surfaces 72, 73 and end surfaces 74, 76 corresponding with the respective horizontal locating surfaces 64, 65 and upright locating 68, 69 surfaces of the main frame 42 for locating the main frame 42 relative to the frame member 70 the generally transverse and vertical directions in the vehicle. The main frame 42 and frame member 70 of the inner panel 40 may overlap along the locating surfaces 64, 65, 68, 69 to position the frame member 70 relative to the main frame 42 in a longitudinal or generally fore and aft direction in the vehicle. The main frame 42 and frame member 70 are fixedly secured to each other to form the inner panel 40.

The frame member 70 has an upper flange 80 and a lower flange 82. A main wall 90 of the frame member 70 extends between the upper flange 80 and lower flange 82 and forms a generally U-shaped or "hat" shaped cross section therewith. The upper 80 and lower 82 flanges are directly fixedly secured to the inner surface 22 of the outer panel 20 resulting in a closed-section support beam that extends longitudinally along the frame member 70.

Figure 2:
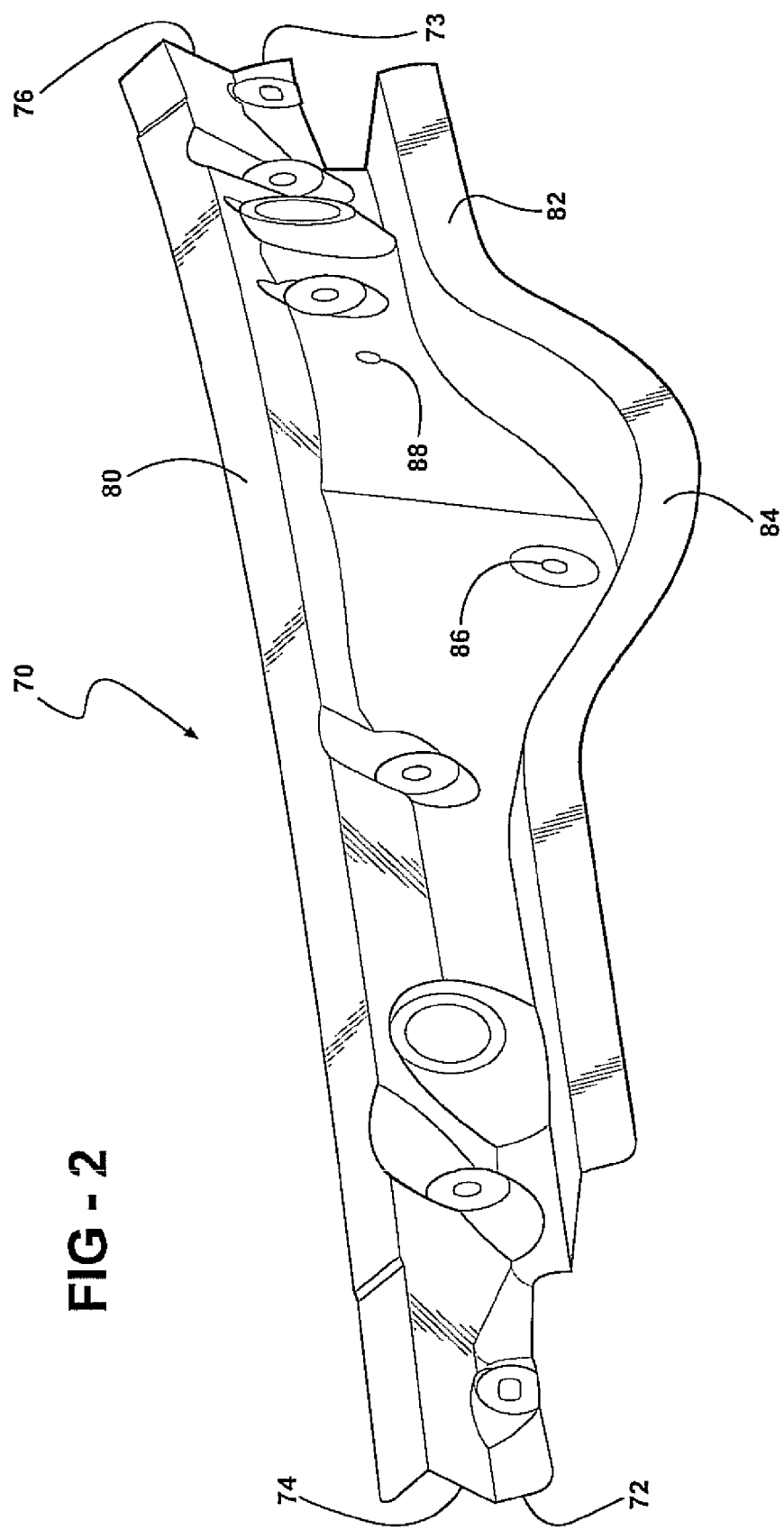
FIG. 2 is a perspective view of a frame member of an inner door panel of the rear door assembly.

The lower flange 82 has a middle portion 84 and outer portions 86 extending outwardly from respective opposite sides of the middle portion 84. The outer portions 86 are generally parallel with the upper flange 80. The middle portion 84 is generally arcuate and protrudes outwardly, or downwardly as viewed in FIG. 2, relative to the outer portions 86. A wiper motor assembly 100 is nested or disposed along the middle portion 84 of the lower flange 82. The arcuate shape of the middle portion 84 also results in a beam width that widens toward a center plane of the door assembly and peaks at the center plane to provide enhanced bending strength to the inner panel 40 and outer panel 20.

The wiper motor assembly 100 may be fixedly secured to the frame member 70 of the inner panel 40 by any suitable fastener, such as bolts. In the illustrated embodiment, the wiper motor assembly 100 is fixedly secured by fasteners 102 extending through holes 86, 88 formed in the main wall 90 of the frame member 70.

Figure 4:
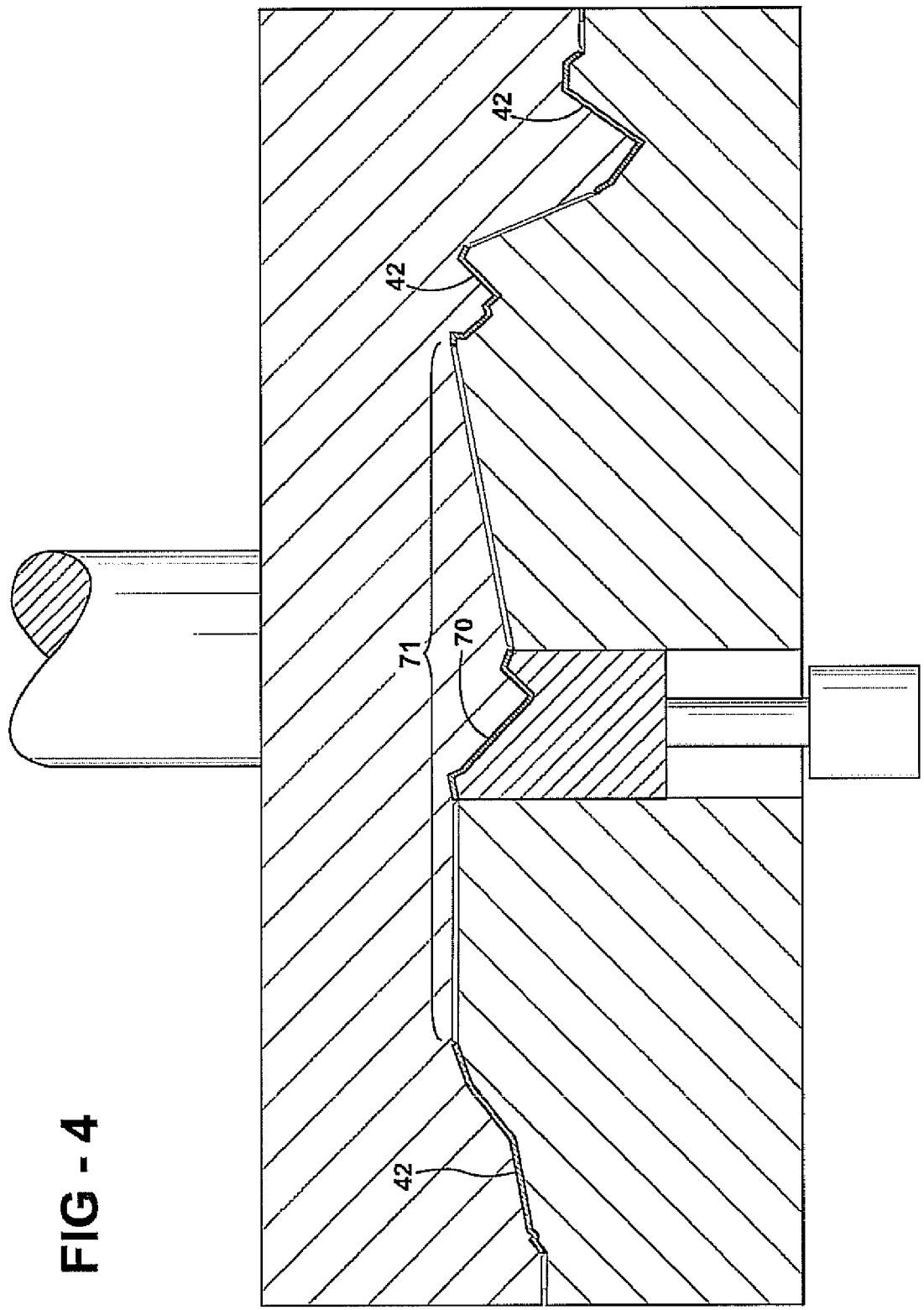
FIG. 4 is a cross sectional view of a tool for making members of the rear door assembly.
Figure 5:
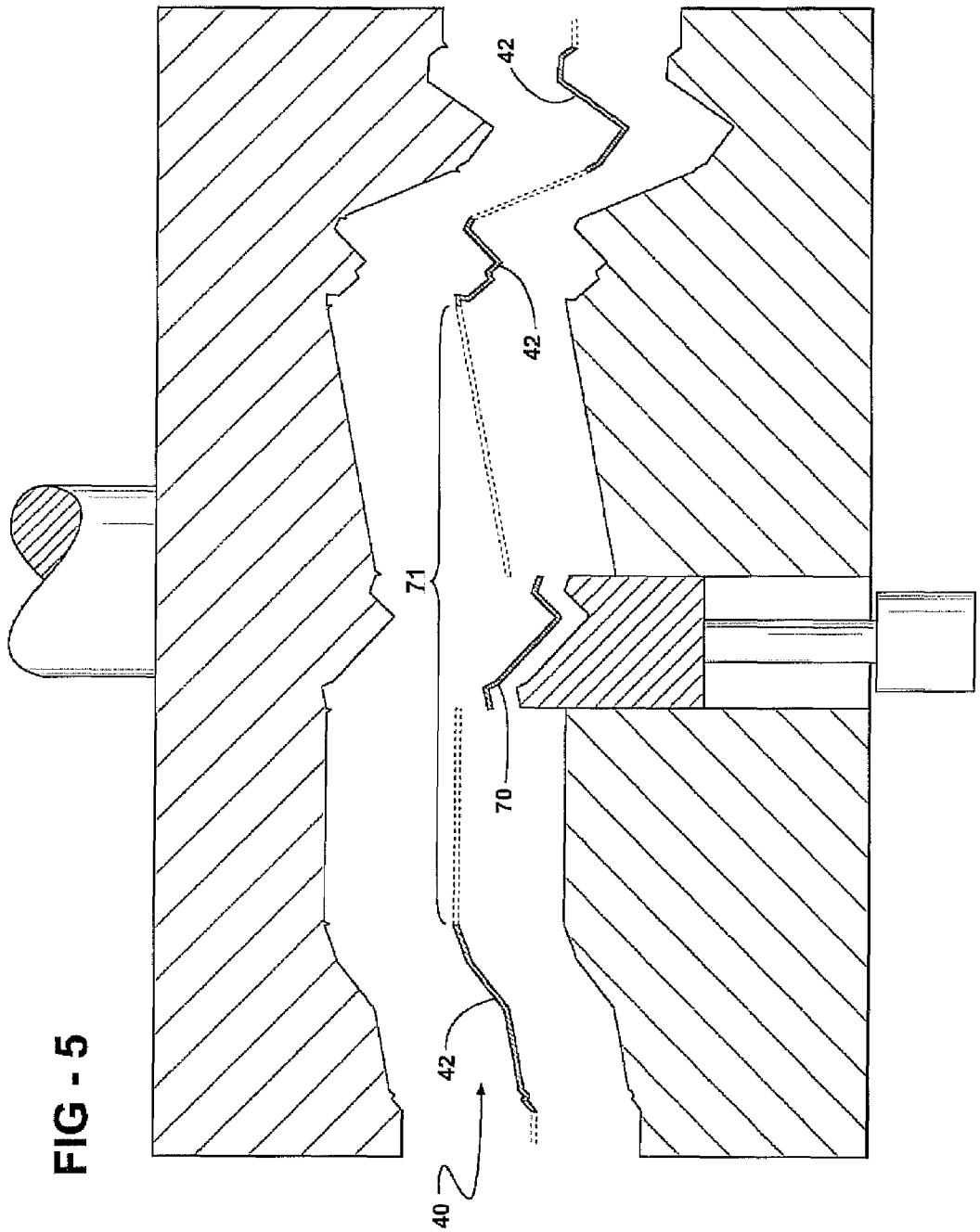
FIG. 5 is a cross sectional view of the tool in FIG. 4 just after formation of the members of the rear door assembly.

The inner panel 40 has a predetermined depth. Forming the inner panel 40 as a single stamped piece with this depth may not, however, be possible or practical. For example, the depth may exceed a maximum draw depth allowed by a metal stamping or pressing tool or may result in a longer cycle time than is allowed by particular production requirements. In this case, as illustrated in FIGS. 4 and 5, the inner panel 40 may be formed from two pieces 42, 70 formed from a single sheet of metal. For example, the frame member 70 may be pressed out of a salvage piece 71 resulting from the formation of the opening for the window 26. The resulting press depth of the two-piece stamping could, for example, be less than the maximum draw depth allowed by the tool or allow shorter cycle times. The two-pieces 42, 70, formed from a single piece of metal, may be fixedly secured to each other in a subsequent operation to form the inner panel 40, as earlier described. Thus, a variety of designs with relatively deep draw depths may be produced without the need to invest in larger or additional tooling.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A rear door assembly for a motor vehicle comprising:
    an outer panel having a window opening and an inner surface; and
    an inner panel fixedly secured to the inner surface of the outer door panel, the inner panel having:
        a main frame having a generally transversely extended opening; and
        a frame member fixedly secured to the main frame, the frame member extending between opposite sides of the opening in the main frame and extending along a bottom edge of the window opening, the frame member having a transversely extending upper flange and a lower flange spaced apart from the upper flange, the frame member having a main wall extending between the upper and lower flanges and forming a generally U-shaped cross section therewith, the flanges being directly fixedly secured to the inner surface of the outer panel and forming a transversely extending support beam therewith.

2. A rear door assembly as set forth in claim 1, wherein the lower flange has a middle portion and outer portions extending generally transversely and outwardly from opposite sides of the middle portion.

3. The rear door assembly as set forth in claim 2, wherein the middle portion is generally arcuately shaped and forms a beam section having a width that widens toward a center plane of the door assembly and peaks at the center plane of the door assembly.

4. The rear door assembly as set forth in claim 3, wherein middle portion of the lower flange bows downwardly relative to the outer portions.

5. The rear door assembly as set forth in claim 4 including a wiper assembly supported on the main wall between.

6. The rear door assembly as set forth in claim 5, wherein the wiper assembly is nested along the middle portion of the lower flange.

7. A rear door assembly as set forth in claim 3, wherein the outer portion are generally parallel with the upper flange.

8. The rear door assembly as set forth in claim 1, wherein the transversely extending opening in the main frame is larger than and extends below the window opening in the outer panel.

9. The rear door assembly as set forth in claim 8, wherein the main frame includes an upwardly facing edge that defines a bottom of the transversely extending opening.

10. The rear door assembly as set forth in claim 9, wherein the frame member is spaced above the upwardly facing edge of the main frame.

11. The rear door assembly as set forth in claim 10, wherein the upwardly facing edge includes a generally horizontal middle section and a pair of angled sections that are angled upwardly and outwardly from respective opposite ends of the middle section.

12. The rear door assembly as set forth in claim 11, wherein the angled sections terminate at symmetrically opposite and opposing locating sections, each locating section having a generally horizontal locating surface and a generally upright locating surface for locating the frame member relative to the main frame in generally transverse and vertical directions.

13. The rear door assembly as set forth in claim 12, wherein the main frame and frame member overlap along the locating surfaces of the locating sections to locate the frame member relative to the main frame in a generally longitudinal direction in the vehicle.

* * * * *